(12) United States Patent
Crofts et al.

(10) Patent No.: US 9,567,960 B2
(45) Date of Patent: Feb. 14, 2017

(54) FUEL PUMP TAPPET ASSEMBLY

(71) Applicant: Cummins Inc., Columbus, IN (US)

(72) Inventors: John D. Crofts, Edinburgh, IN (US); Justin Gregory Wenger, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 332 days.

(21) Appl. No.: 14/224,882

(22) Filed: Mar. 25, 2014

(65) Prior Publication Data
US 2015/0275834 A1 Oct. 1, 2015

(51) Int. Cl.
| | |
|---|---|
| *F02M 59/10* | (2006.01) |
| *F01M 9/10* | (2006.01) |
| *F16J 10/04* | (2006.01) |
| *F01L 1/255* | (2006.01) |
| *F01L 1/14* | (2006.01) |
| *F01L 1/245* | (2006.01) |
| *F02M 59/06* | (2006.01) |
| *F04B 1/04* | (2006.01) |
| *F02M 41/14* | (2006.01) |

(52) U.S. Cl.
CPC ............... *F02M 59/102* (2013.01); *F01L 1/14* (2013.01); *F01L 1/146* (2013.01); *F01L 1/245* (2013.01); *F01L 1/255* (2013.01); *F01M 9/104* (2013.01); *F02M 59/06* (2013.01); *F04B 1/0417* (2013.01); *F16J 10/04* (2013.01); *F01L 2107/00* (2013.01); *F02M 2041/1494* (2013.01); *F02M 2200/02* (2013.01)

(58) Field of Classification Search
CPC ...... F02M 59/02; F02M 59/06; F02M 59/102; F02M 2041/1494; F02M 2200/02; F02B 1/0417;F02B 39/126; F01L 1/14; F01L 1/146; F01L 1/245; F01L 1/25; F01L 1/255; F01L 2001/256; F01L 13/0031; F01L 2003/11; F01L 2107/00; F01M 9/104; F16J 10/04
USPC ......................................................... 92/171.1
See application file for complete search history.

(56) References Cited

U.S. PATENT DOCUMENTS

| | | | |
|---|---|---|---|
| 6,273,042 B1 | 8/2001 | Perez et al. | |
| 7,311,087 B2 | 12/2007 | Shaull et al. | |
| 7,328,688 B2 | 2/2008 | Savage et al. | |
| 7,513,756 B2 | 4/2009 | Aoki et al. | |
| 7,568,461 B1 | 8/2009 | Straub | |
| 2007/0041848 A1* | 2/2007 | Wood | F02M 59/102 417/273 |
| 2007/0071622 A1 | 3/2007 | Schoeppe | |
| 2010/0037865 A1* | 2/2010 | Fuchs | F04B 1/0439 123/508 |
| 2015/0361836 A1* | 12/2015 | Dorn | F02M 59/102 123/90.48 |

FOREIGN PATENT DOCUMENTS

| | | | | |
|---|---|---|---|---|
| DE | 102009001633 A1 | * | 9/2010 | ........... F02M 59/102 |
| DE | 2012097953 A1 | * | 7/2012 | ................ F01L 1/14 |

* cited by examiner

*Primary Examiner* — Logan Kraft
(74) *Attorney, Agent, or Firm* — Faegre Baker Daniels LLP

(57) ABSTRACT

A fuel pump assembly for an internal combustion engine includes a fuel pump housing, a cylindrical bore defined in the fuel pump housing, and a tappet assembly received in the cylindrical bore. The tappet assembly includes a one-piece shoe having a recess disposed in a bottom portion thereof, and a roller that is partially received within the recess and configured to rotate about a roller axis.

19 Claims, 5 Drawing Sheets

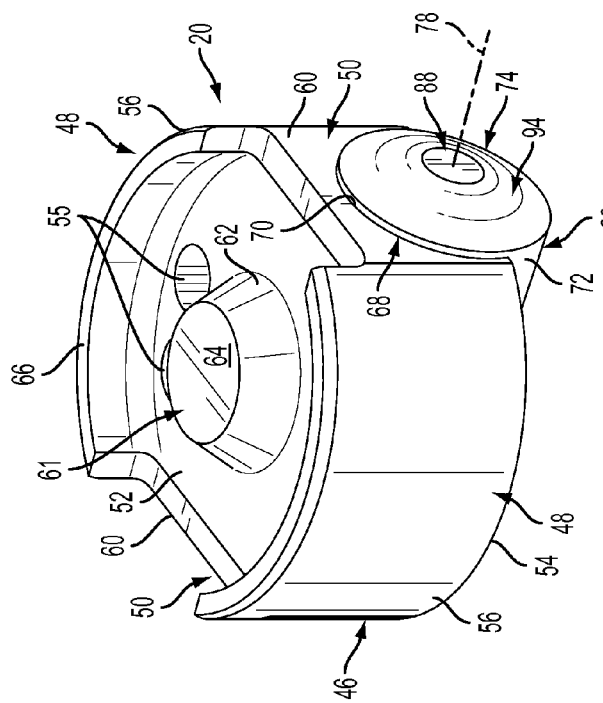
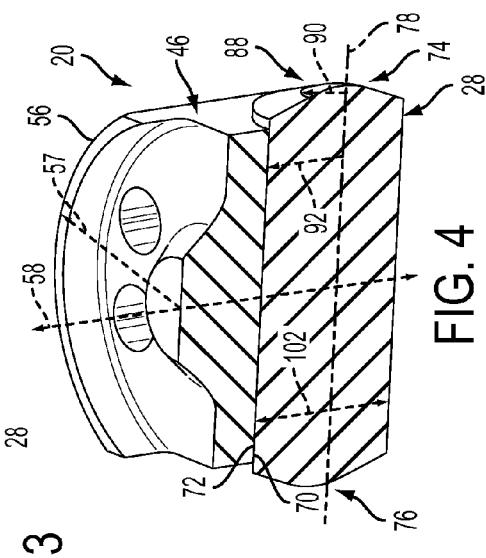
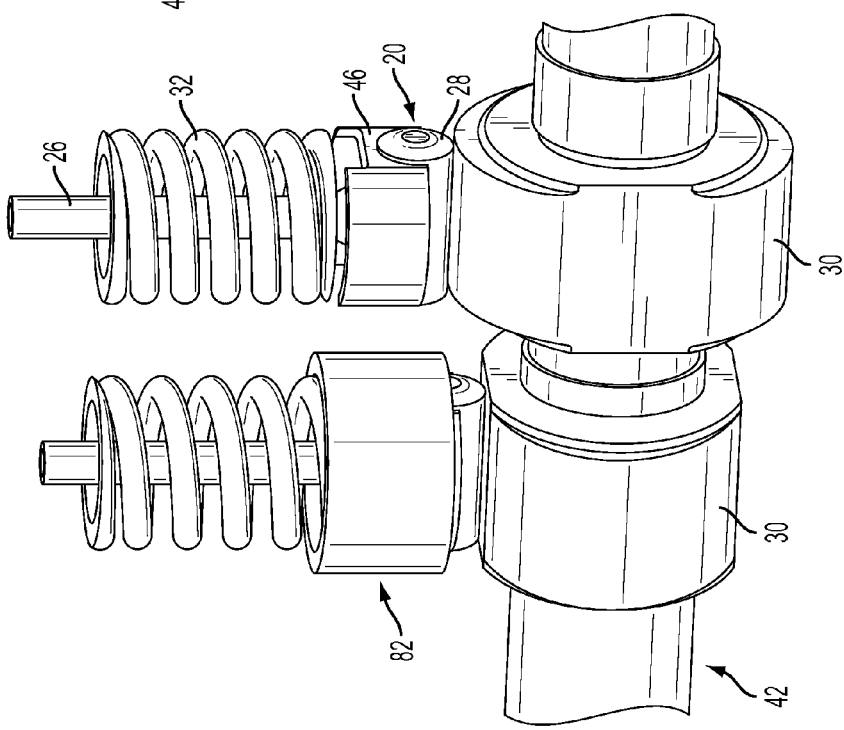

FUEL PUMP TAPPET ASSEMBLY

FIELD OF THE INVENTION

The invention relates to fuel pumps with reciprocating tappet assemblies.

BACKGROUND

A fuel pump used to provide fuel to an internal combustion engine may be driven by a lobed camshaft that displaces a tappet assembly, within a cylindrical bore, with a roller that rolls along the cam lobe. The reciprocating motion of the tappet assembly generates fuel flow that is used by the internal combustion engine to generate power. These types of fuel pumps are popular in modern fuel systems, and are frequently used in common rail fuel systems applications where high fuel pressures are required. In the prior art discussed below, the motion of the tappet assembly within the cylindrical bore is guided using a guiding member.

U.S. Pat. No. 7,568,461, issued to Straub, discloses a high pressure fuel injection pump having a roller tappet that includes a follower body that is received in a lower portion of a generally cylindrical guide sleeve. The follower body is fitted in an inner wall of the guide sleeve, which limits lateral motion of the roller and moves within the pumping cylinder with the follower body.

U.S. Publication No. 2007/0071622, filed by Schoeppe, discloses a high pressure fuel pump assembly having a roller tappet that includes a roller that is received by a rectangular shoe. The shoe travels within a guide path formed by the walls of an insert having a rectangular inner surface. The outer surface of the insert is cylindrical so that the insert can be disposed within a cylindrical opening of the pump housing.

U.S. Pat. No. 7,311,087, issued to Shaull et al., discloses a fuel supply pump having a tappet structure body that includes a shell, a roller body, and a roller. The shell includes an opening (slit) within which a guide pin slides to guide the movement of the tappet structure body within a cylindrical space in the pump housing.

SUMMARY

Embodiments of the present invention include a one-piece tappet assembly configured to be received, and to reciprocate, within a cylindrical bore defined in a fuel pump housing. In embodiments, the tappet assembly includes a one piece shoe that includes a generally cylindrical peripheral surface that is perpendicular to an axis of the roller and that guides the tappet assembly's reciprocating motion within the pump housing. This design may allow the roller axis to self-align with the camshaft axis without additional guide features. Additionally, embodiments of the one-piece design described herein may have less mass than conventional tappet assemblies and may be manufactured at a lower cost (e.g., because the shoe can be molded and/or machined as a single piece). Embodiments also include a wear-resistant sleeve in the pump housing that facilitates guiding the tappet assembly's reciprocating motion and also limits the axial travel of the roller.

In particular, embodiments of the invention include a fuel pump assembly for an internal combustion engine including a fuel pump housing, a cylindrical bore defined in the fuel pump housing, and a tappet assembly received in the cylindrical bore. The tappet assembly includes a shoe having a recess disposed in a bottom portion thereof, and a roller that is partially received within the recess and configured to engage a cam lobe and to rotate about a roller axis. In embodiments, the shoe includes a peripheral surface having a cylindrical shape that is configured to correspond to an inside surface of the cylindrical bore.

Embodiments of the invention include a fuel pump assembly for an internal combustion engine including a fuel pump housing, a cylindrical bore defined in the fuel pump housing, and a tappet assembly slideably received in the cylindrical bore. The tappet assembly includes a shoe having a recess disposed in a bottom portion thereof, and a roller that is partially received within the recess and configured to rotate about a roller axis. In embodiments, the shoe includes an upper surface, a lower surface, a pair of parallel, opposed end portions, and a pair of opposed curved sides extending between the end portions, each curved side having a cylindrical peripheral surface that is configured to correspond to an inside surface of the cylindrical bore.

Embodiments of the invention also include a tappet assembly configured for use in a fuel pump for an internal combustion engine. The fuel pump includes a fuel pump housing having a cylindrical bore defined therein. The tappet assembly may include a one-piece shoe having a recess defined in a bottom portion thereof and a roller that is partially received within the recess and configured to engage a cam lobe and to rotate about a roller axis. The shoe includes a peripheral surface having a cylindrical shape that is configured to correspond to an inside surface of the cylindrical bore.

BRIEF DESCRIPTION OF THE DRAWINGS

FIG. 2 is a perspective view of portions of the fuel pump assembly depicted in FIG. 1, including a cam shaft and tappet assemblies in accordance with embodiments of the present invention;

FIG. 3 is a perspective view of a tappet assembly in accordance with embodiments of the present invention;

FIG. 4 is a cross-sectional perspective view of the tappet assembly depicted in FIG. 3 in accordance with embodiments of the present invention;

Figure 1:
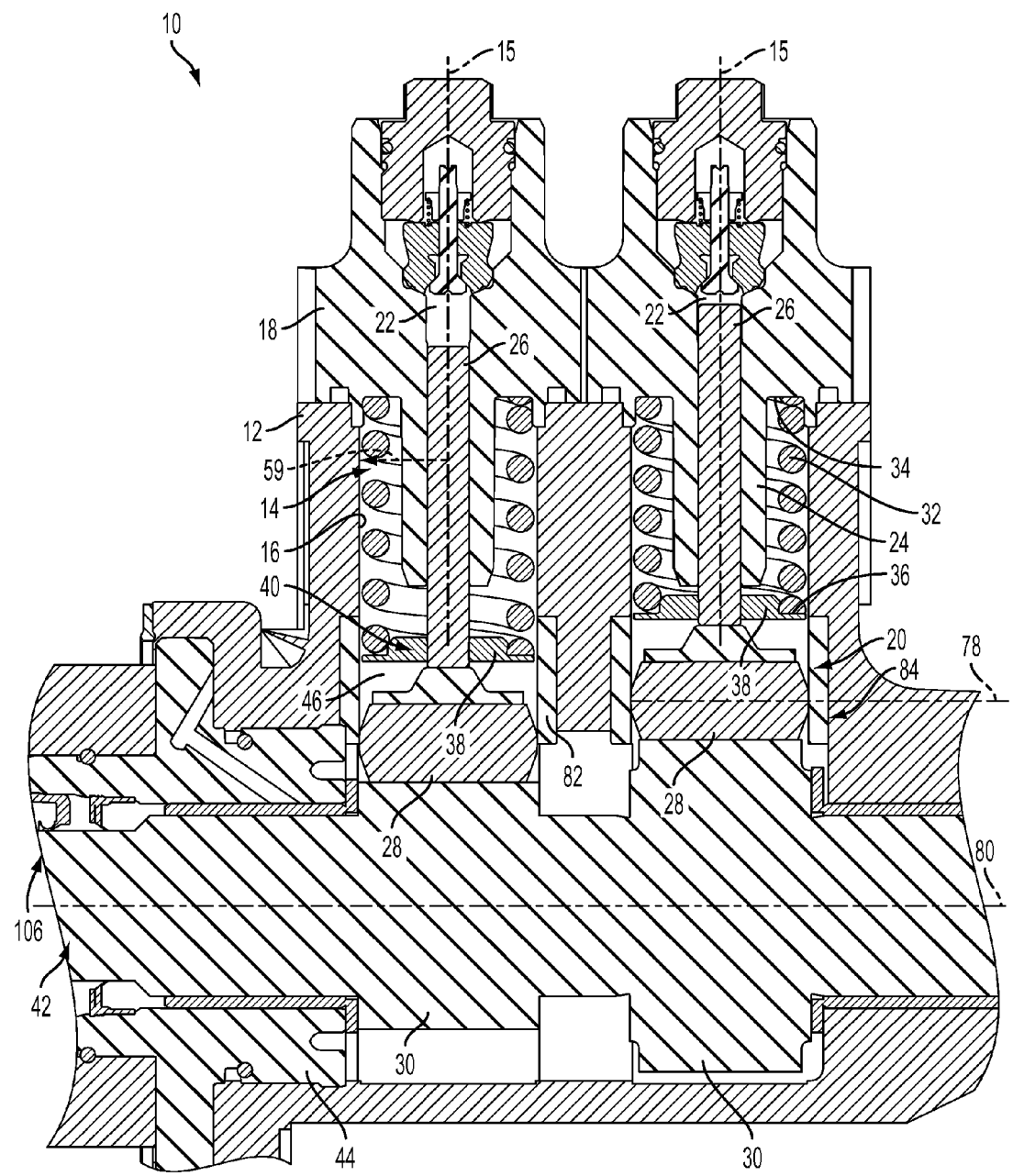
FIG. 1 is a cross-sectional side view of a fuel pump assembly in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

DETAILED DESCRIPTION

FIG. 1 is a cross-sectional side view of a portion of a fuel pump assembly 10 in accordance with embodiments of the present invention. The fuel pump assembly 10 shown in FIG. 1 includes a fuel pump housing 12 with cylindrical bores 14 that each have a central axis 15 and corresponding inside surfaces 16 that at least partially define the cylindrical bores 14. The cylindrical bores 14 are closed at an upper end by a cylinder head 18. Received in the cylindrical bores 14 are tappet assemblies 20 which are also shown in a perspective, non-cross-sectional view in FIG. 2. It should be noted that, whereas the illustrated embodiment of the fuel pump assembly 10 shown in FIG. 1 is provided with two separate cylindrical bores 14 and corresponding tappet assemblies 20, the illustrated fuel pump assembly 10 is merely one example, and embodiments of the present invention may be implemented in other fuel pumps with one or any desired number of tappet assemblies 20. For clarity, the description that follows will describe a single tappet assembly 20, with reference to illustrations of two identical tappet assemblies 20, but should be understood to be generally applicable to any number of tappet assemblies and related elements falling within the ambit of embodiments of the present invention.

As is further depicted in FIG. 1, a plunger bore 22 is defined partially within the cylinder head 18 and partially within a pumping nose 24 that extends into the cylindrical bore 14. A pump plunger 26 is slideably disposed within the plunger bore 22. The tappet assembly 20 is adapted to reciprocate within the cylindrical bore 14, causing the pump plunger 26 to slide up and down within the plunger bore 22, thereby causing fuel to be pumped by the fuel pump assembly 10. In this regard, the tappet assembly 20 includes a roller 28 that contacts, and rolls along, the surface of a camshaft lobe 30. The tappet assembly 20 is biased toward the camshaft lobe 30 by a biasing spring 32 that extends between a lower surface 34 of the cylinder head 18 and an upper surface 36 of a plunger retainer 38. In embodiments, the plunger retainer 38 is press-fit onto a distal portion 40 of the pump plunger 26. In embodiments, the slight rotational motion at the lower end of the biasing spring 32 (resulting from the change in length of the helical spring) is not transferred to the tappet assembly 20 since the spring load is transferred by a pump plunger 26 having a relatively small diameter.

The cam lobe 30 is provided on a camshaft 42 that is supported by a bearing 44, and driven by an appropriate drive mechanism such as a pulley or gear of an internal combustion engine. As the camshaft 42 is rotated, the cam lobe 30 displaces the tappet assembly 20 within the cylindrical bore 14 for pumping the fuel, the tappet assembly 20 being displaced in a reciprocating manner within the cylindrical bore 14 by the cam lobe 30, and a return action effectuated by the biasing spring 32. In embodiments, the camshaft 42 may include one cam lobe 30, two cam lobes 30, or more than two cam lobes 30.

As shown in FIGS. 1-4, and in accordance with embodiments of the invention, the tappet assembly 20 includes a one-piece shoe 46 configured to receive the roller 28. According to embodiments of the invention, the shoe 46 is a single piece, which may be, for example, molded and/or machined from a single workpiece. As illustrated, the shoe 46 includes two curved sides 48, two opposed end portions 50, an upper side 52 and a lower side 54, and may include apertures 55 extending from the upper side 52 to the lower side 54. The apertures 55 may be configured to allow lubrication to pass through the shoe 46 to the roller 28.

Each of the curved sides 48 of the shoe 46 includes a cylindrically-shaped peripheral surface 56. The cylindrically-shaped peripheral surfaces 56 are configured to correspond to the shape of the inside wall 16 of the cylindrical bore 14. In other words, a radius 57 extending from (and perpendicular to) a center axis 58 of the shoe 46 (which may, for example, correspond to central axis 15 depicted in FIG. 1) to the peripheral surface 56 is configured to be almost the length of a radius 59 extending from (and perpendicular to) the central axis 15 to the inside surface 16 of the cylindrical bore 14 such that the shoe 46 is slideably received within the cylindrical bore 14. In embodiments, as shown, the two opposed end portions 50 each include a generally flat surface 60. The flat surfaces 60 are configured to be parallel to one another. The biasing spring 32 biases the pump plunger 26 to maintain contact with the tappet assembly 20. In embodiments, the plunger 26 may engage a raised portion 61 defined on the upper side 52 of the shoe 46. As shown, the raised portion 61 may include a conical protrusion 62 having a flat upper surface 64. In embodiments, the cylindrical peripheral surfaces 56 extend upwardly above the level of the upper side 52 and may extend above the upper side 52 by a distance such that an upper edge 66 of each cylindrical peripheral surface 56 lies in a plane with the flat upper surface 64 of the raised portion 61.

The lower side 54 of the shoe 46 includes a recess 68 defined therein. The recess 68, which is defined by a cylindrical inner bearing surface 70, extends between the two end portions 50 of the shoe 46. The roller 28 is rotatably received within the recess 68. In embodiments, the roller 28 includes a cylindrical outer surface 72 extending between a first end 74 and a second end 76 and is configured to rotate about a roller axis 78 that may be oriented at least substantially perpendicular (i.e., perpendicular, or within a few degrees of being perpendicular) to each of the end portions 50 of the shoe 46 and to the central axis 15 of the cylindrical bore 14. In embodiments, the shoe 46 (in particular, the cylindrical peripheral surfaces 56) is configured to correspond to the inside surface 16 of the cylindrical bore 14 so as to guide a reciprocating motion of the tappet assembly 20 within the cylindrical bore 14 without a need for any additional guiding features.

Figure 5:
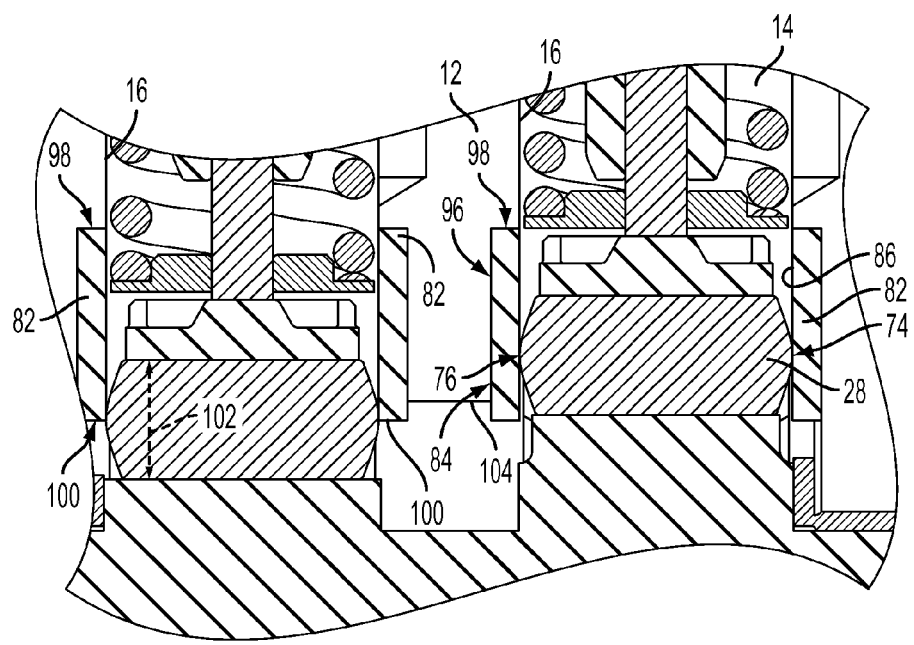
FIG. 5 is a side cross-sectional side view of a portion of the fuel pump assembly depicted in FIGS. 1 and 2 in accordance with embodiments of the present invention.

As shown in FIGS. 1 and 5, lateral motion of the roller 28 along the roller axis 78 (and/or other motion other than rotation about the roller axis 78 such as, for example, twisting motion) within the recess 68 is limited by a sleeve 82 that is disposed within a lower portion 84 of the cylindrical bore 14. In embodiments, the sleeve 82 comprises a cylindrical shell that is fixed within the cylindrical bore 14. For example, the sleeve 82 may be a steel shell that is cast in and machined in place within the lower portion 84 of the cylindrical bore 14. As shown in FIG. 5, the sleeve 82 includes an inner surface 86 that is configured to engage the ends 74 and 76 of the roller 28. According to embodiments, and shown in FIGS. 3 and 4, each end 74 and 76 of the roller 28 includes an engagement surface 88 that is engageable with the inner surface 86 of the sleeve 82. The engagement surface 88 is defined by a radius 90 with respect to the roller axis 78 that is inward of an outer radius 92 defined by the outer surface 72 of the roller 28 with respect to the roller axis 78. In embodiments, each engagement surface 88 extends outward (along the roller axis 78) away from the end portions 50 of the shoe 46, thereby forming a conical shape 94 at each end 74 and 76 of the roller 28.

As shown in FIG. 5, the sleeve 82 may be fixed within an annular recess 96 defined within the housing 12 such that the inner surface 86 of the sleeve 82 forms a flush intersection 98 with the inner surface 16 of the cylindrical bore 14, thereby creating a continuous surface within the bore 14. Additionally, in embodiments, a lower end 100 of the sleeve 82 is disposed at a position such that, when the roller 28 is at its lower-most position during reciprocation, no more than half of the diameter 102 of the roller 28 extends below the lower end 100 of the sleeve 82. In embodiments, the lower end 100 of the sleeve 82 may extend below a lower surface 104 of the housing 12. In this manner, at least a portion of each engagement surface 88 of the roller 28 maintains engagement with the inner surface 86 of the sleeve 82, thereby limiting rotational movement (about the central axis 15) of the roller 28 and, thus, facilitating self-alignment of the roller axis 78 and the cam axis 80. In embodiments, the cam lift may be greater than half the roller diameter 102.

Figure 6:
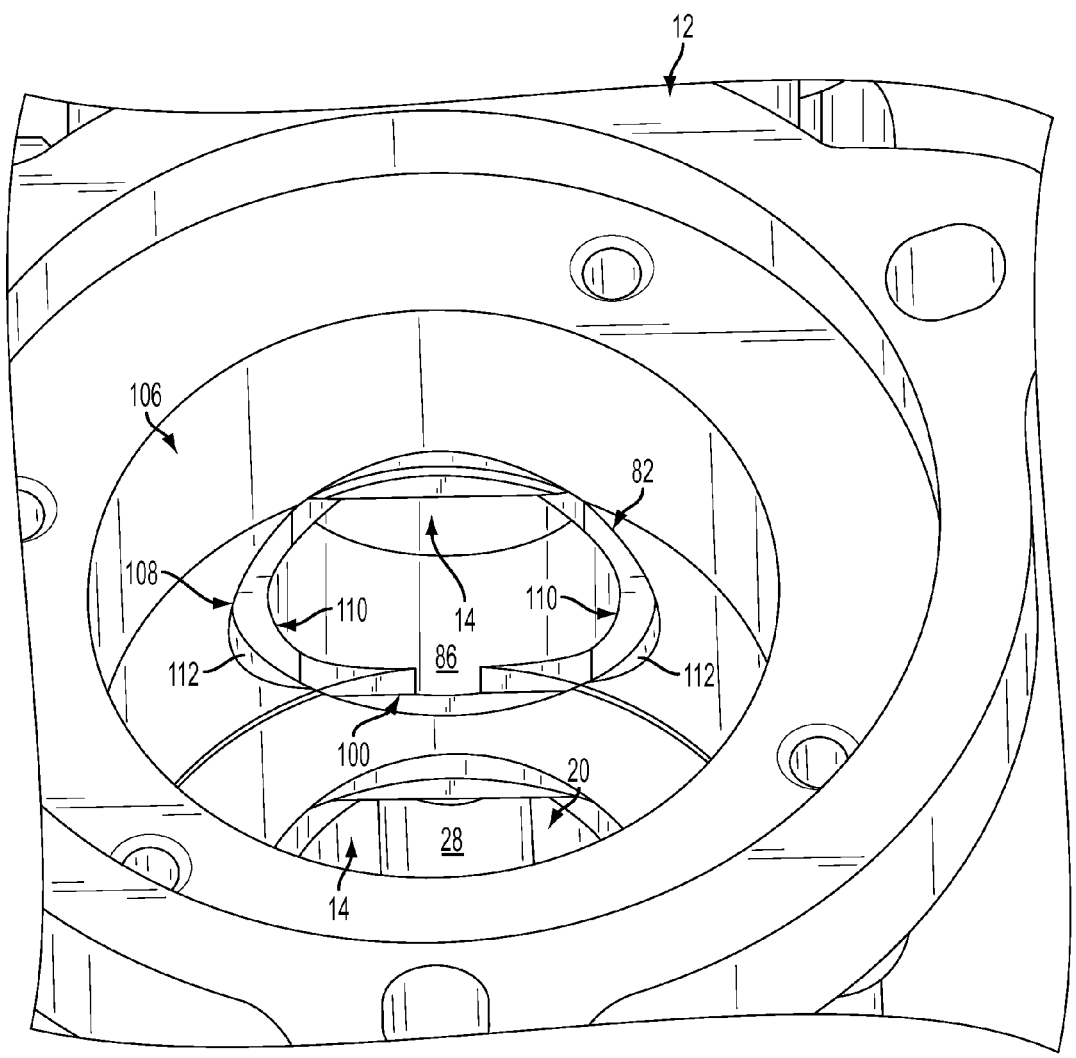
FIG. 6 is a perspective view of a portion of the fuel pump housing and sleeve depicted in FIGS. 1, 2, and 5 in accordance with embodiments of the present invention.
Figure 7:
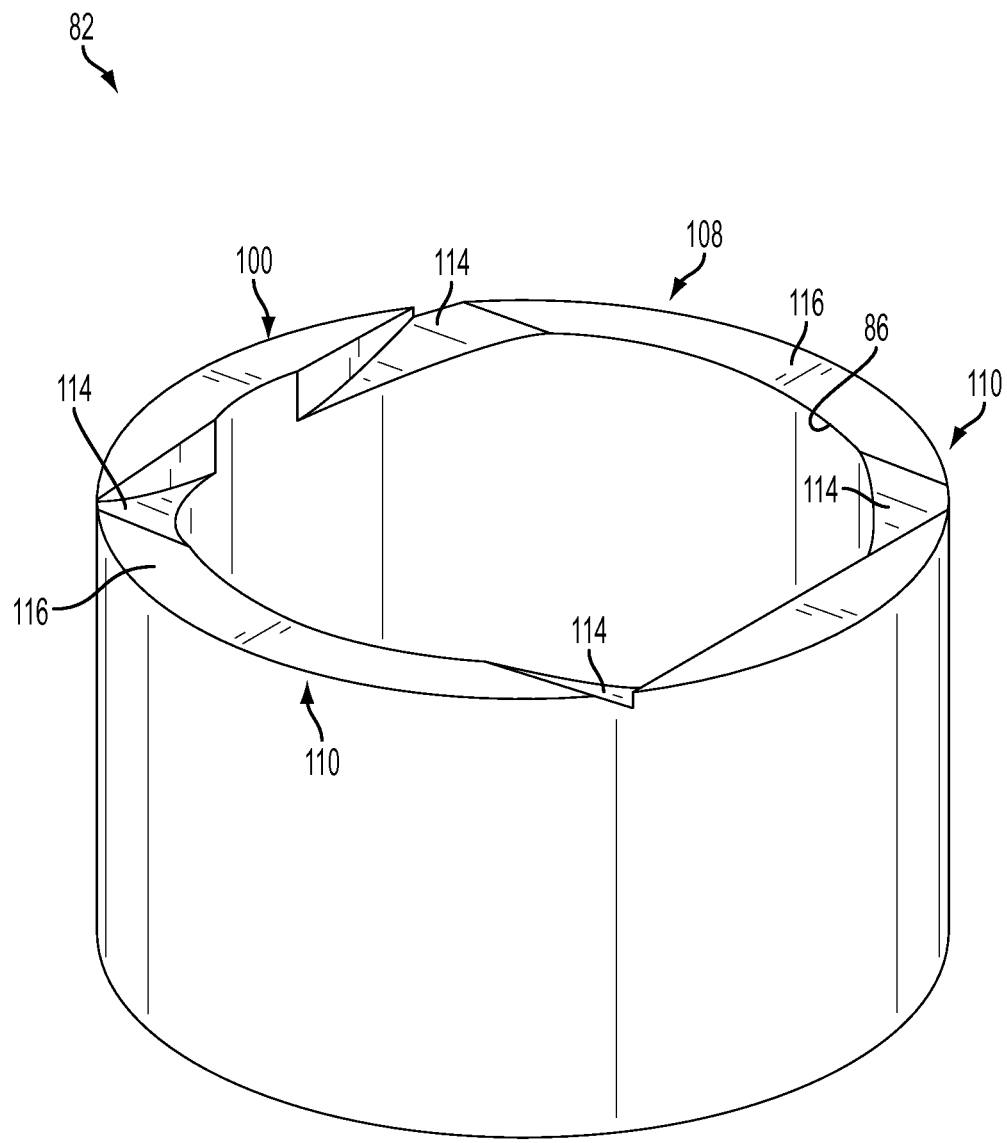
FIG. 7 is a perspective view of the sleeve depicted in FIG. 6, in accordance with embodiments of the present invention.

To provide clearance for the cam lobe 30 as it rotates, a square-edge revolve cut may be made in the sleeve 82, as shown in FIGS. 6 and 7. FIG. 6 is a perspective view into a camshaft chamber 106 defined in the pump housing 12, illustrating a cylindrical bore 14 with the tappet assembly removed and a portion of a cylindrical bore 14 with a tappet assembly 20 disposed therein. The camshaft chamber 106 is configured to receive the camshaft 42, which rotates therein. According to embodiments, as indicated above, the sleeve 82 may be cast in and machined in place within the pump housing 12. After insertion into the pump housing 12, the revolve cut may be made to create a clearance path 108 configured to allow passage of the lobe 30 of the camshaft 42.

As shown in FIGS. 6 and 7, the clearance path 108 may include a recess 110 defined in the lower end 100 of the sleeve 82, as well as a pair of recesses 112 defined in the pump housing 12. As illustrated, each recess 112 may include a curved, edge that is angled upwards, toward the cylindrical bore 14. As shown in FIG. 7, for example, the recess 110 may include a number of notches 114 and a pair of opposed, curved angled edges 116 defined in the lower end 100 of the sleeve. In embodiments, the recess 110 may be formed using one or two, smooth cutting actions, with a square-edged cutting device. The cutting action or actions may also be the same cutting action or actions used to create the two recesses 112 defined in the pump housing. The clearance path 108 may be configured to provide any amount of clearance for the cam lobe 30. For example, the cam lobes 30 may be configured to have approximately 1.8 mm of clearance from the lower end 100 of the sleeve 82 and the total cam lift may be approximately 8.5 mm. Additionally, in embodiments, during assembly, the camshaft 42 is assembled into the housing 12 with each of the cam lobes 30 positioned at approximately a 45 degree angle with respect to the horizontal.

While embodiments of the present invention are described with specificity, the description itself is not intended to limit the scope of this patent. Thus, the inventors have contemplated that the claimed invention might also be embodied in other ways, to include different steps or features, or combinations of steps or features similar to the ones described in this document, in conjunction with other technologies.

The following is claimed:

1. A fuel pump assembly for an internal combustion engine comprising:
    a fuel pump housing;
    a cylindrical bore defined in the fuel pump housing, wherein an upper end of the cylindrical bore is closed by a lower surface of a cylinder head; and
    a tappet assembly slideably received in the cylindrical bore, wherein the tappet assembly includes a one-piece shoe having a recess defined in a bottom portion thereof, and a roller that is partially received within the recess and configured to engage a cam lobe and to rotate about a roller axis, wherein the shoe comprises a peripheral surface having a cylindrical shape that is configured to correspond to an inside surface of the cylindrical bore, wherein the shoe further comprises two opposed end portions, wherein each of the end portions comprises a flat surface that extends across a corresponding end of the recess beyond which a corresponding end of the roller extends, wherein along the roller axis each of the flat surfaces is an outermost portion of the shoe.

2. The fuel pump assembly of claim 1, wherein the roller comprises a cylindrical outer surface extending between a first end and a second end.

3. The fuel pump assembly of claim 1, wherein the shoe further comprises an upper surface that is perpendicular to a central axis of the cylindrical bore.

4. The fuel pump assembly of claim 3, further comprising a sleeve disposed along a lower portion of the cylindrical bore, wherein the sleeve is configured to limit lateral motion of the roller along the roller axis.

5. The fuel pump assembly of claim 4, wherein the sleeve comprises a wear-resistant steel insert fixed within a recess defined in an inner surface of the lower portion of the cylindrical bore.

6. The fuel pump assembly of claim 4, wherein a lower end of the sleeve extends below a lower surface of the pump housing such that less than half of the diameter of the roller extends below the lower end of the sleeve at any given time.

7. The fuel pump assembly of claim 6, wherein the lower end of the sleeve includes a revolve cut defined therein, wherein the revolve cut is configured to allow passage of a portion of the cam lobe as the cam lobe rotates.

8. The fuel pump assembly of claim 4, wherein each end of the roller comprises an engagement surface that is configured to engage an inside surface of the sleeve.

9. The fuel pump assembly of claim 3, wherein the shoe further comprises a raised portion disposed on the upper surface, wherein the raised portion is configured to engage a lower end of a pump plunger.

10. The fuel pump assembly of claim 9, further comprising a plunger retainer that is press-fit onto a lower portion of the pump plunger and a biasing spring that extends between the lower surface of the cylinder head and an upper surface of the plunger retainer.

11. A fuel pump assembly for an internal combustion engine comprising:
    a fuel pump housing;
    a cylindrical bore defined in the fuel pump housing; and
    a tappet assembly slideably received in the cylindrical bore, wherein the tappet assembly includes a roller configured to rotate about a roller axis and a shoe, the shoe comprising:
    an upper surface;
    a lower surface;
    a recess defined in the lower surface, wherein the recess is configured to partially receive the roller;
    a pair of parallel, opposed end portions, wherein each of the end portions comprises a flat surface that extends across a corresponding end of the recess beyond which a corresponding end of the roller extends, wherein along the roller axis each of the flat surfaces is an outermost portion of the shoe; and
    a pair of opposed curved sides extending between the end portions, each curved side having a cylindrical peripheral surface that is configured to correspond to an inside surface of the cylindrical bore.

12. The fuel pump assembly of claim 11, further comprising a sleeve disposed along a lower portion of the cylindrical bore, wherein the sleeve is configured to limit lateral motion of the roller along the roller axis.

13. The fuel pump assembly of claim 12, wherein a lower end of the sleeve extends below a lower surface of the pump housing such that less than half of the diameter of the roller extends below the lower end of the sleeve at any given time.

14. The fuel pump assembly of claim 12, wherein the sleeve comprises a wear-resistant steel insert partially fixed within a recess defined in an inner surface of the lower portion of the cylindrical bore.

15. The fuel pump assembly of claim 12, wherein each end of the roller comprises an engagement surface that is configured to engage an inside surface of the sleeve.

16. A tappet assembly configured for use in a fuel pump for an internal combustion engine, the fuel pump including a fuel pump housing having a cylindrical bore defined therein, the tappet assembly comprising:
 a one-piece shoe having a recess defined in a bottom portion thereof; and
 a roller that is partially received within the recess and configured to engage a cam lobe and to rotate about a roller axis, wherein the shoe comprises a peripheral surface having a cylindrical shape that is configured to correspond to an inside surface of the cylindrical bore, wherein the shoe further comprises two opposed end portions, wherein each of the end portions comprises a flat surface that extends across a corresponding end of the recess beyond which a corresponding end of the roller extends, wherein along the roller axis each of the flat surfaces is an outermost portion of the shoe.

17. The tappet assembly of claim 16, wherein the roller comprises a cylindrical outer surface extending between a first end and a second end, and wherein each end of the roller comprises an engagement surface that is configured to engage an inside surface of a sleeve disposed along a lower portion of the cylindrical bore.

18. The tappet assembly of claim 16, wherein the shoe further comprises an upper surface that is perpendicular to a central axis of the cylindrical bore.

19. The tappet assembly of claim 18, wherein the shoe further comprises a raised portion disposed on the upper surface, wherein the raised portion is configured to engage a lower end of a pump plunger.

* * * * *